United States Patent [19]

Asselman et al.

[11] 3,889,096
[45] June 10, 1975

[54] ELECTRIC SOLDERING IRON DELIVERING HEAT BY CHANGE OF STATE OF A LIQUID HEAT TRANSPORTING MEDIUM

[75] Inventors: George Albert Apolonia Asselman; Adrianus Petrus Dirne, both of Emmasingel, Eindhoven, Netherlands

[73] Assignee: U.S. Philips Corporation, New York, N.Y.

[22] Filed: Feb. 22, 1973

[21] Appl. No.: 334,866

Related U.S. Application Data

[63] Continuation of Ser. No. 160,732, July 8, 1971.

[30] Foreign Application Priority Data

July 11, 1970 Netherlands ..................... 7010304

[52] U.S. Cl. ............... 219/229; 165/105; 219/236; 219/530; 219/540; 228/51
[51] Int. Cl. ..... H05b 1/00; B23k 3/04; F28d 15/00
[58] Field of Search .... 219/227, 229, 230, 236–239, 219/326, 530, 540; 165/105; 126/400; 228/51–55; 126/413, 414

[56] References Cited
UNITED STATES PATENTS

| | | | |
|---|---|---|---|
| 57,354 | 8/1866 | Maxim | 219/227 UX |
| 1,295,750 | 2/1919 | Hibbs | 219/227 UX |
| 1,468,106 | 9/1923 | Hadaway | 219/530 X |
| 1,536,094 | 5/1925 | Hadaway | 219/227 UX |
| 2,835,480 | 5/1958 | Perez | 219/326 UX |
| 2,992,313 | 7/1961 | Taylor | 165/105 X |
| 3,229,759 | 1/1966 | Grover | 165/105 |
| 3,379,118 | 4/1968 | Perez | 219/242 UX |
| 3,603,767 | 9/1971 | Scicchitano | 219/326 |

*Primary Examiner*—A. Bartis
*Attorney, Agent, or Firm*—Frank R. Trifari; David R. Treacy

[57] ABSTRACT

A soldering device having a hollow and closed soldering element which contains a heat transporting medium. The soldering element is supported in a holder and may be slidably removed therefrom. The holder is also provided with a electric element for providing heat to a first heat transmission wall of the soldering element. The heat transporting medium absorbs thermal energy from the heating element through the first heat transmission wall and changes from the liquid phase into a vapor phase. The vapor supplies the thermal energy to a second heat transmission wall of the soldering element which is at a point of the element forming the soldering place which produces the heat necessary for the soldering operation. The vapor changes back into the liquid phase at the soldering place. A capillary mass of porous material is provided along the inside of the soldering element so that the liquid heat transporting medium can flow back through the porous mass from the second heat transmission wall back to the first heat transmission wall as a result of capillary action.

3 Claims, 11 Drawing Figures

INVENTORS
GEORGE A.A. ASSELMAN
ADRIANUS P. DIRNE

ELECTRIC SOLDERING IRON DELIVERING HEAT BY CHANGE OF STATE OF A LIQUID HEAT TRANSPORTING MEDIUM

This is a continuation, division, of application Ser. No. 160,732, filed July 8, 1971.

The invention relates to a soldering device having at least one soldering element supported by a holder a heating place where thermal energy can be supplied to the element and a soldering place where soldering heat can be withdrawn from the element.

Devices of this type are known. The holder of these devices usually is constructed as a grip or is provided with a separate grip.

The soldering elements usually consist of solid metal, for example copper (see for example German Pat. No. 393,266) and are often in the form of a bit.

Heating of the soldering element is effected by means of electric resistance heating wire, and sometimes by means of induction or an electric light arc.

The known soldering devices having a solid metal soldering element suffer from several drawbacks.

The soldering element has to meet a certain diameter: length ratio so as to be able to supply the amount of thermal energy required for soldering in combination with the required soldering temperature. Such soldering devices therefore have restricted possibilities of use. Such a device is not well suited for making joints which are difficult to connect to circuit elements of small dimensions such as frequently occur in the electronic industry. A soldering element having very small dimensions are required in these cases. Such small soldering elements have therefore been developed especially for use in the electronic industry, (see for example, Belgian Pat. Nos. 483,116 and 496,120), but they have a disadvantage of being complicated and expensive. A considerable temperature gradient usually exists between the heating place (the point on the soldering element which receives heat) and the soldering place (that point on the soldering element where the soldering operation takes place) so that the heating place has to be heated to a higher temperature in order for the correct temperature to be produced at the soldering place.

The construction of the soldering element as a solid element makes the soldering device comparatively heavy. Also the heating place should have comparatively large dimensions due to its comparatively low capacity of thermal dissipation. These two facts limit a soldering device to only one soldering element in order to keep the dimensions and the weight of the soldering device within acceptable limits. In all kinds of manufacturing processes, however, it frequently occurs that a plurality of soldered joints can or must be made simultaneously, which requires an equally large number of soldering devices.

It is the object of the present invention to provide a soldering device of an expensive and simple construction in which the above-mentioned disadvantages are avoided. In order to accomplish this, the soldering device according to the invention is provided with a hollow and closed soldering element which contains a heat transporting medium which absorbs thermal energy from the heat source through a, which forms the heating place, first heat transmission wall and changes the liquid phase into the vapor phase. The medium supplies thermal energy to a second heat transmission wall, the soldering place, and changes from the vapor phase back into the liquid phase. The space in the soldering element also has a porous mass which connects the second to the first heat transmission wall. The liquid heat transporting medium can flow back through the porous mass from the second to the first heat transmission wall due to capillary action.

Liquid heat transporting medium which evaporates at the first heat transmission wall moves in the vapour phase to the second heat transmission wall as a result of the lower vapour pressure prevailing there owing to the slightly lower temperature at that region. The vapor then condenses on the second heat transmission wall while supplying the heat of evaporation to the said wall, after which the condensate is returned, via the porous mass and by capillary action, while using the surface tension of the condensate, to the first heat transmission wall to be evaporated there again. Since the heat is transported by means of an evaporation-condensation process instead of by conduction, one is no longer restricted to a certain diameter: length ratio for the soldering elements. It is therefore possible to manufacture soldering elements of a simple construction almost any desired dimensions and for a variety of applications.

Because of the ratatively high heat of evaporation of liquids, a large amount of thermal energy can be stored in the vapour and be transported from the first to the second heat transmission wall per unit of time while a good heat transmission between the liquid and the heat transmission walls is ensured by condensation.

Due to the large heat transporting capacity of the medium in the soldering element there is substantially no temperature drop between the first and the second heat transmission wall. So the latter will assume a temperature which is substantially equal to the temperature of the first heat transmission wall. Determination, if any, of the temperature at the soldering place can be accomplished by temperature measurements at the area of the heating place.

As a result of the presence of the porous mass, return of condensate from the second to the first transmission wall is ensured in all circumstances, even against gravity. The soldering device is therefore independent of position, which provides a large freedom of arrangement.

The porous mass may be formed, for example, by ceramic materials, by gauzes of wire or tape-shaped material of metals or metal alloys, or by an arrangement of pipes. A system of grooves in the wall of the container combined or not combined with one of the other above alternatives, is also among the possibilities.

The choice of the heat transporting medium is determined in the first instance by the operating temperature of the soldering place. When this temperature lies in the region of 500° to 1000°C, sodium, for example, may be chosen. Alternative choices include: the metal potassium, lithium cadmium, cesium, metal salts such as the metal halogens zinc chloride, aluminum bromide, cadmium iodide, calcium iodide, zinc bromide or mixtures thereof, nitrates and nitrites or mixtures thereof. The choice of material for the soldering element of course depends upon the operating temperature and the heat transporting medium chosen. For example, when sodium is used, chromiun-nickel steel may be considered for the soldering element.

Due to the large heat transporting capacity of the heat transporting medium carried in the soldering element, it is possible to bring a soldering surface of large dimensions to the desirable soldering temperature by heating a first heat transmission wall of relatively small dimensions through the process of evaporation-condensation. By subdividing this large soldering surface into a number of separate, smaller, and if desirable unequal surfaces, a plurality of soldering places may be obtained. One embodiment of the soldering device according to the invention provides a hollow soldering element provided with several second heat transmission walls thereby forming a plurality of soldering places.

This provides the great advantage that several joints can be made simultaneously with only one soldering element and one heat source, for example, an electric heating coil. As a result of the large freedom in the design of the soldering element, joints may lie at different levels, have surfaces to be soldered of different sizes and be more or less difficult of access.

Therefore, such a soldering element is extremely suitable for use in all kinds of manufacturing process particularly in the electronic industry. As a result of the hollow construction of the soldering element, the soldering device is comparatively light in weight.

In another embodiment of the soldering device according to the invention the holder has one heat source which can cooperate with a plurality of soldering elements.

As already stated, the first heat transmission wall may have relatively small dimensions due to the large heat transporting capacity of the medium in the soldering element, and still maintain sufficiently large heat transfer to the second heat transmission wall. Together with the comparatively low weight per soldering element and the freedom in proportioning and design of the said element, this facilitates the production of a compact, light-weight soldering device having a plurality of soldering elements and only one heat source. The heat source may heat all the soldering elements simultaneously, or, for example, only one or a few at a time. The soldering elements may have different dimensions and soldering place temperatures.

Normally, the space inside the soldering element is evacuated so that the process of evaporation-condensation can run off smoothly. In certain circumstances, however, it may occur that gaseous contaminations diffuse through the wall of the soldering element to the space inside said element or are released during operation of the soldering device from the wall and the porous mass, respectively. In soldering elements having small dimensions of the soldering places, this may result in the gases collecting at the area of the second heat transmission wall serving as a soldering place and inhibiting condensation of heat transporting medium on the said wall. In order to prevent this, each of the soldering elements is incorporated in the holder so as to be slidable in the direction from the first to the second heat transmission wall from a position in which the heat source can supply thermal energy to the first heat transmission wall to a position in which the heat source can supply thermal energy to the second heat transmission wall and in which in the first-mentioned position the space within the soldering element extends to beyond the heat source.

By first heating the second heat transmission wall with the heat source in the holder and then sliding the soldering element past the heat source through the holder, the gases are driven in the direction of the first heat transmission wall to beyond said wall in the space at the end of the soldering element. The gases remain collected in said space and produce no further disturbances.

In order that the invention may be readily carried into effect, several embodiments of the soldering device will now be described in greater detail, by way of example, with reference to the diagrammatic FIGS. 1 to 9 which are not drawn to scale, in which.

FIG. 4a is a view of another embodiment of a soldering device according to the present invention in which the soldering element has a line-shaped soldering place;

FIG. 4b is a cross-sectional view taken along line IVb—IVb of FIG. 4a;

FIG. 8b is a cross-sectional view taken along lines VIIIb—VIIIb of FIG. 8a, and

Figure 1:
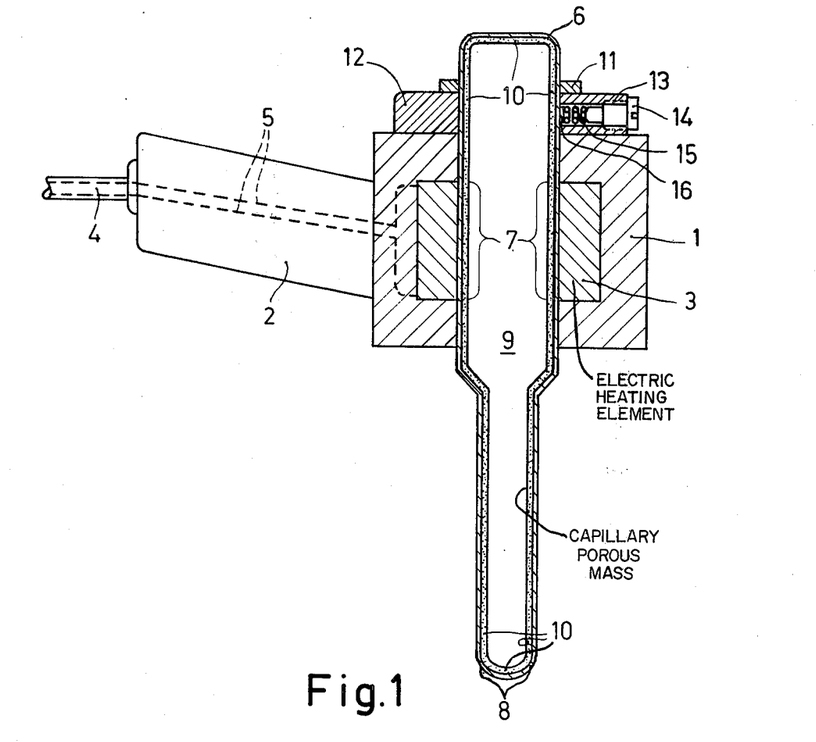
FIG. 1 is an elevational view in cross-section of a soldering device according to the present invention.

Referring now to FIG. 1, reference numeral 1 denotes a holder comprising a grip 2, in which holder an electric heating element 3 is incorporated which can be connected to an electric voltage source, via electric conductors 5 passed through holder 1 and grip 2, respectively, and further incorporated in a cable 4.

The holder supports a soldering element 6 which is of a tubular and hollow construction. At the area of the heating element 3 the soldering element 6 comprises a first heat transmission wall 7 which serves as a place to be heated and a second heat transmission wall 8 at its lower end which serves as a soldering place. The evacuated space 9 inside the soldering element 6 contains a suitably chosen quantity of liquid heat transporting medium which at the operating temperature of the heating element can evaporate at the area of the first heat transmission wall 7. Furthermore, a layer of porous material 10 is provided in the space 9 on the walls of the soldering element 6, the material having such a capillary structure that during operation liquid heat transporting medium, irrespective of the position of the soldering element, is returned, due to capillary action, from comparatively cold places, notably the second heat transmission wall 8, through the layer of porous material to the comparatively warm first heat transmission wall 7.

The soldering element 6 can slide in the holder 1 in the axial direction, the movement in the downward direction of the element being limited by a flange 11 attached to the soldering element which can abut against a ring 12 mounted on the holder 1.

The ring 12 is provided with a screw-threaded radial aperture 13 and a screw 14 fit therein. Upon tightening of the screw 14 a plate 16, connected to a compression spring 15 is pressed against the soldering element 6 through said compression spring 15. In this manner the soldering element 6 is held inside the holder 1 without the danger of upward movement of the soldering element when an upward force is exerted on said element at the area of the second heat transmission wall 8 during a soldering operation.

The operaion of the soldering device is as follows:

The liquid heat transporting medium within the element absorbs thermal energy from the heating element 3 through the first heat transmission wall 7 and evaporates. The vapor then flows to the second heat transmission wall 8 as a result of the lower vapour pressure which prevails there due to the slightly lower temperature at that area and condenses on the second heat transmission wall while supplying the heat of evaporation absorbed at the first heat transmission wall 7. Said thermal energy is supplied to the solder through the heat transmission wall 8. The condensate flows through the layer of porous material 10, by capillary action, using the surface tension of the condensate, back to the first heat transmission wall 7 to again evaporate there.

When gaseous contaminations are present in the evacuated space 9 at the area of the second heat transmission wall 8 and hamper the condensation on said wall, which may occur notably in small soldering elements having small cross-sections, the following procedure may be followed when putting the soldering device into operation. First, the soldering element 6 is removed from the holder 1 by unscrewing the screw 14. The heating element 3 is then switched on after which the soldering element 6 is inserted lower side first, into the top of the holder 1.

The second heat transmission wall 8 held in the heating range of the heating element 3 and is then heated so that the undesirable gases are driven to the colder upper part of the soldering element 6. By slowly lowering the soldering element further into the holder 1 past the heating element 3, the undesirable gases will be driven upward so that when the element is in its final position within holder 1, as shown in the figure, the gases will have been collected in the part of the space, 9 present above the heating element 3 and will no longer disturb the process of evaporation condensation.

In FIGS. 2 to 9 the same reference numerals are used for components corresponding to those of FIG. 1.

Figure 2:
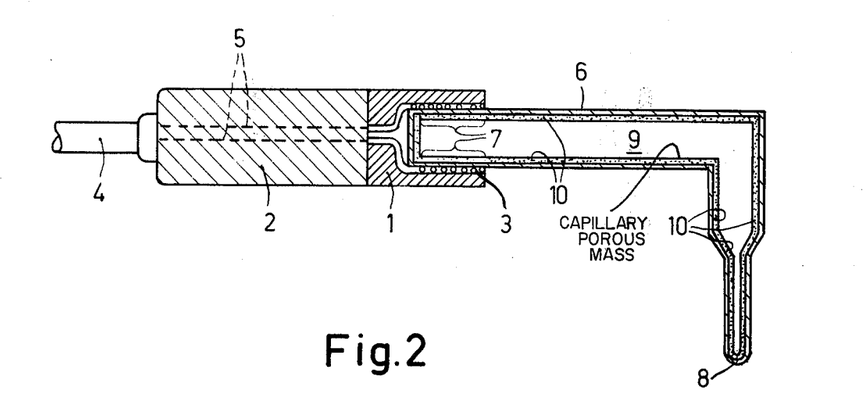
FIG. 2 is a view similar to that of FIG. 1, showing a further embodiment of a soldering device according to the invention in which the heating element is a coil wound about the first heat transmission wall.

In FIG. 2 the soldering element 6 is incorporated with its one end in the holder 1. The heating element 3 in this case is a heating coil which is wound around the first heat transmission wall 7. The operation of this and the following embodiments is identical to that of the device shown in FIG. 1, so that further description may be omitted.

Figure 3:
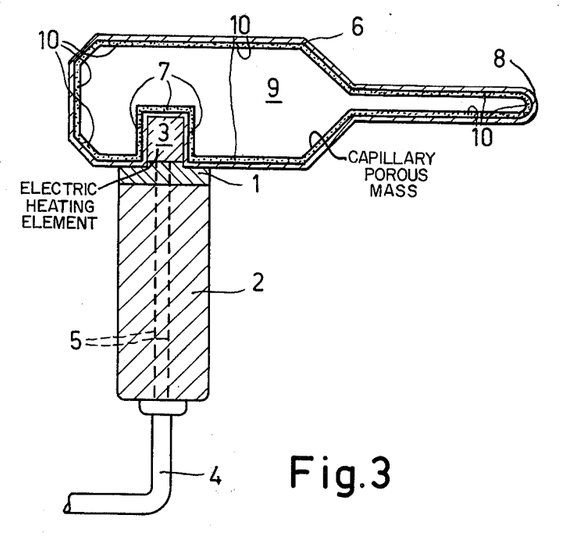
FIG. 3 is another cross-sectional view of a soldering device showing the heating element fit in a cavity of the soldering element.

In the soldering device shown in FIG. 3 the soldering element 6 comprises a first heat transmission wall 7 which is bent in such manner as to bound a cavity in which the holder 1 is accurately fit. The heating element 3 is accommodated in the part of the holder 1 fitting in the cavity.

Figures 4A, 4B:
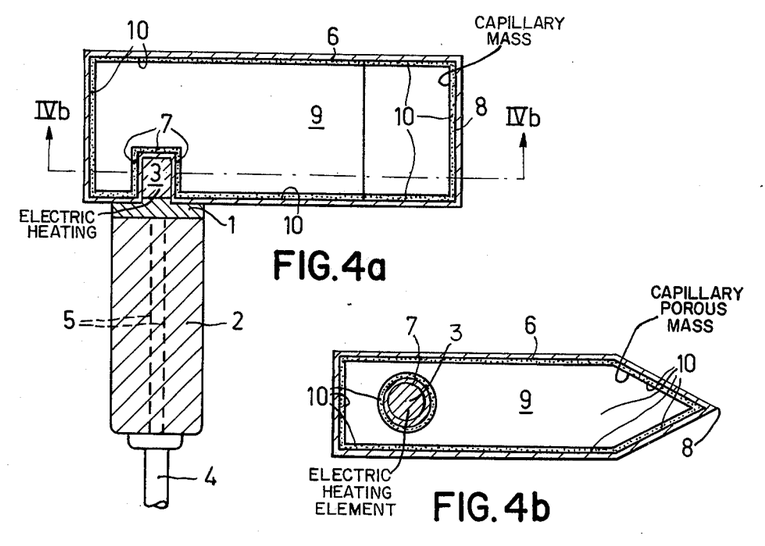

The soldering device shown in FIGS. 4a and 4b is in general the same as that shown in FIG. 3. In this embodiment the second heat transmission wall 8 is line-shaped. FIG. 4b is a cross-sectionnal view of FIG. 4a taken on the line IVb—IVb.

Figure 5:
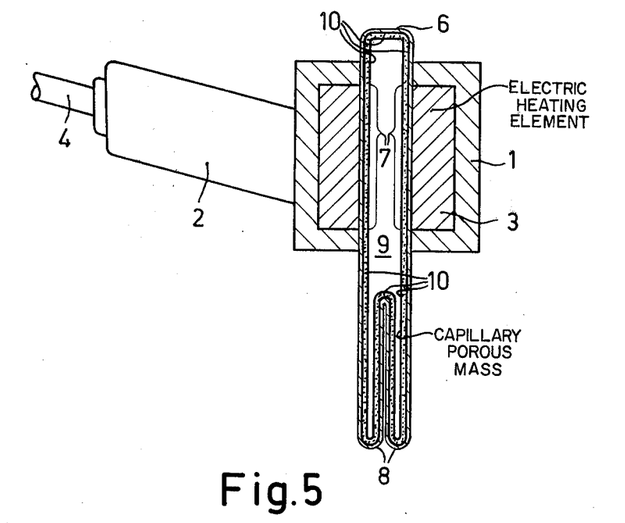
FIG. 5 is a view of a further embodiment of the present invention to which the soldering element has two equal soldering places.

In FIG. 5 the soldering element 6 comprises two second heat transmission walls 8 which are present beside each other at the same level and have equal surfaces. Two places can be soldered simultaneously by means of this soldering device.

Figure 6:
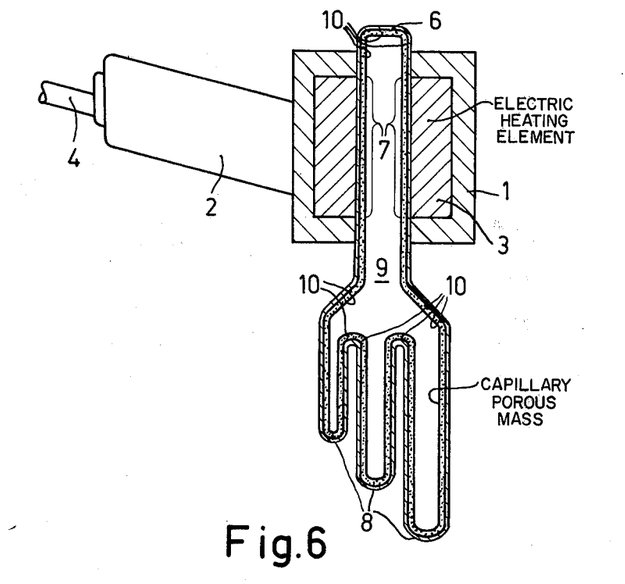
FIG. 6 is a view of a further embodiment of the present invention in which the soldering element has three unequal soldering places.

In the soldering device shown in FIG. 6 the soldering element 6 comprises three second heat transmission walls 8 which are located at different levels and have different surfaces. By means of such a soldering device, which, as described in the introduction of this specification, may have a very compact construction, soldered joints which are located at different levels, require different quantities of soldering heat, and which are difficult to get at, can be made in one operation and in a simple manner.

In the soldering device shown in FIG. 6 the centers of the second heat transmission walls 8 are located in one plane through the longitudinal axis of the soldering element 6.

Figure 7:
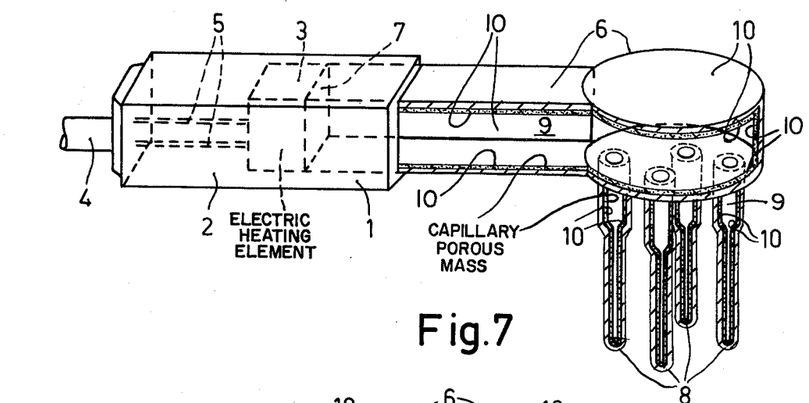
FIG. 7 is a view of yet another embodiment of the present invention in which the soldering element has a plurality of soldering places arranged three dimensionally.

This is not the case with the soldering device shown in FIG. 7, in which the soldering element 6 comprises four second heat transmission walls 8 which are arranged three-dimensionally, in this case at the same level and with the same surfaces. The end face of the part of the soldering element 6 inserted in the holder 1 in this embodiment serves as a first heat transmission wall 7.

Figure 8A:
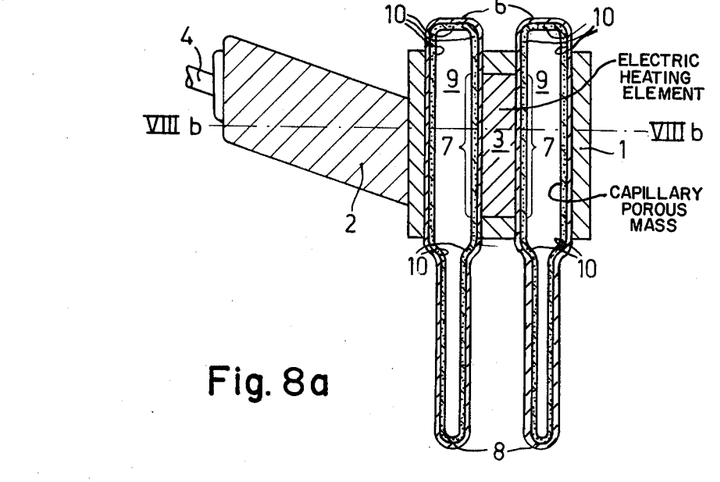
FIG. 8a is an elevational cross-sectional view taken along lines VIIIa—VIIIa of FIG. 8b showing an embodiment of the present invention having two separate soldering elements.
Figure 8B:
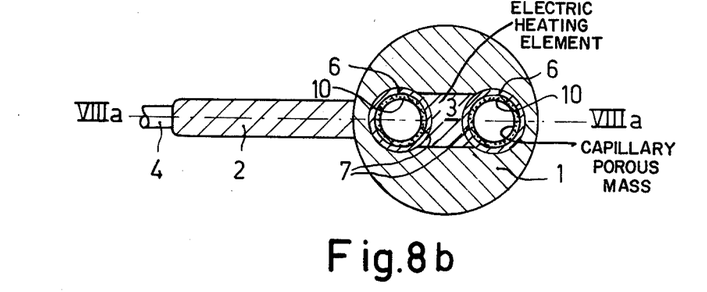

In the device shown in FIG. 8 the holder 1 supports two soldering elements 6 which in the present case are of identical construction, although this is not necessary. The first heat transmission walls 7 are heated while using one and the same heating element 3.

FIG. 8b is a cross-sectional view of the soldering device taken on the line VIIIb—VIIIb of FIG. 8a, in which a longitudinal cross-section view is shown taken on the line VIIIa—VIIIa of FIG. 8b.

Figure 9:
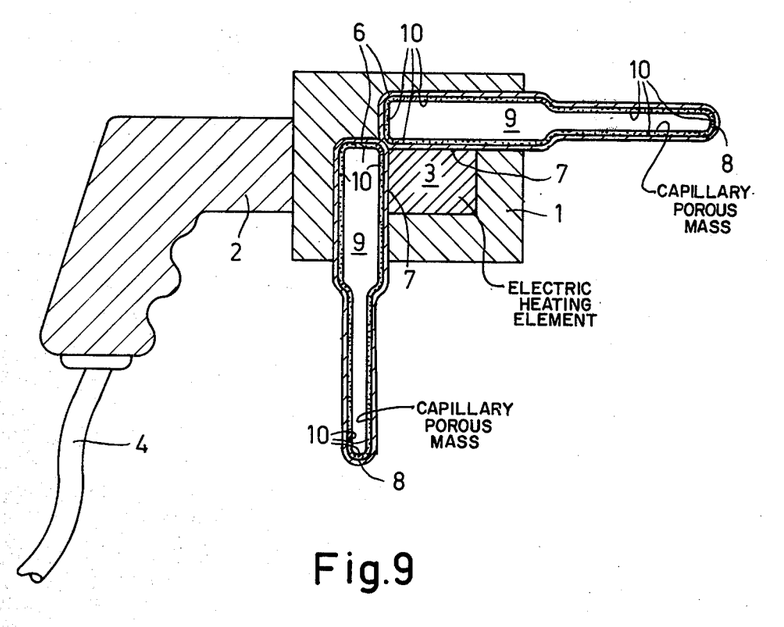
FIG. 9 is a view of an embodiment of the present invention having two separate soldering elements arranged at right angles to each other.

The soldering device shown in FIG. 9 is a variation of that shown in FIG. 8. In this embodiment the two soldering elements 6 are arranged at right angles relative to each other.

Of course, all kinds of other arrangements are possible using more than two soldering elements, mutually identical or different at regards dimensions, design, heat transporting medium, surfaces of the heat transmission walls etc. The soldering elements may furthermore be incorporated in the holder so as to be exchangeable or not exchangeable.

It will be obvious from the above that the invention provides an extremely attractive soldering device of a simple and inexpensively construction having a soldering element which can be realized in all kinds of shapes and dimensions, notably very small shapes and dimensions, is light in weight and shows substantially no temperature drop between the heating place and the soldering place, while, substantially maintaining the compactness and the low weight, the soldering device may comprise a plurality of soldering places and/or soldering elements incorporated in the same holder.

What is claimed is:

1. A soldering device comprising a holder, at least one hollow and closed soldering element supported by said holder, a heating place formed by a first heat transmission wall located at one point on said soldering element at which point heat can be supplied to said soldering element, at least one hollow soldering tip located at an end of said element formed by at least one second heat transmission wall located at a different point on said soldering element at which point heat can be delivered by said soldering element for performing a soldering operation, a source of heat supported by said holder positioned for supplying heat to said first heat transmission wall of said soldering element, means connected to said heating source for causing it to produce thermal energy, a vaporizable liquid heat transporting medium carried within and partially filling said soldering element for absorbing heat from said source of heat through said first heat transmission wall so that said medium will thereby change from the liquid phase to the vapor phase and will supply heat to the second heat transmission wall and thereby change from the vapor phase back to the liquid phase, and a capillary mass of porous material for providing capillary action contained within said soldering element and extending continuously between said first and second heat transmission walls so that said heat transporting medium in the liquid phase after condensation from the vapor phase can flow back from the second to the first heat transmission wall as a result of capillary action.

2. The soldering device according to claim 1 wherein said hollow soldering element comprises a plurality of separate and independent second heat transmission walls thereby forming a plurality of separate hollow soldering tips, and said capillary mass extends continuously between each of said second heat transmission walls and said first heat transmission wall.

3. The soldering device according to claim 1 wherein said soldering element is slidably carried in the holder so as to be movable in the direction from the first to the second heat transmission wall from a position in which the heat source can supply thermal energy to the first heat transmission wall to a position in which the heat source can supply thermal energy to the second heat transmission wall and in which in the first-mentioned position the space within the soldering element extends to beyond the heat source.

* * * * *

UNITED STATES PATENT AND TRADEMARK OFFICE
CERTIFICATE OF CORRECTION

PATENT NO. : 3889096
DATED : June 10, 1975
INVENTOR(S) : GEORGE A. A. ASSELMAN & ADRIANUS PETURS DIRNE It is certified that error appears in the above-identified patent and that said Letters Patent are hereby corrected as shown below:

Column 1, line 63 - after "through a" insert --first heat transmission wall--

Column 1, line 64 - delete "first heat transmission wall"

Signed and Sealed this twenty-fifth Day of November 1975

[SEAL]

Attest:

RUTH C. MASON
Attesting Officer

C. MARSHALL DANN
Commissioner of Patents and Trademarks